(12) United States Patent
Kelleher et al.

(10) Patent No.: US 8,340,622 B2
(45) Date of Patent: Dec. 25, 2012

(54) ARRANGEMENT OF RADIOFREQUENCY INTEGRATED CIRCUIT AND METHOD FOR MANUFACTURING THEREOF

(75) Inventors: Paul Kelleher, Aherla (IE); Michael Crowley, Blarney (IE); Conor O'Keeffe, Cork (IE)

(73) Assignee: Freescale Semiconductor, Inc., Austin, TX (US)

( * ) Notice: Subject to any disclaimer, the term of this patent is extended or adjusted under 35 U.S.C. 154(b) by 317 days.

(21) Appl. No.: 12/671,239

(22) PCT Filed: Aug. 9, 2007

(86) PCT No.: PCT/IB2007/053166
§ 371 (c)(1),
(2), (4) Date: Jan. 29, 2010

(87) PCT Pub. No.: WO2009/019539
PCT Pub. Date: Feb. 12, 2009

(65) Prior Publication Data
US 2010/0203919 A1    Aug. 12, 2010

(51) Int. Cl.
*H04B 1/16* (2006.01)
(52) U.S. Cl. ............... 455/333; 455/550.1; 455/41.2
(58) Field of Classification Search .......... 455/333, 455/550.1, 41.2
See application file for complete search history.

(56) References Cited

U.S. PATENT DOCUMENTS

| | | | |
|---|---|---|---|
| 6,175,257 B1 * | 1/2001 | Ramanadin | 327/141 |
| 6,573,775 B2 * | 6/2003 | Pilling | 327/202 |
| 7,908,499 B2 * | 3/2011 | Ito | 713/320 |
| 2005/0064892 A1 * | 3/2005 | Cavin | 455/550.1 |
| 2006/0174044 A1 * | 8/2006 | Bomhoff et al. | 710/110 |
| 2006/0221905 A1 | 10/2006 | Behzad et al. | |
| 2007/0071078 A1 | 3/2007 | Yoshida et al. | |
| 2007/0171866 A1 | 7/2007 | Merz et al. | |

FOREIGN PATENT DOCUMENTS
WO    2008/146090 A1    12/2008

OTHER PUBLICATIONS

International Search Report and Written Opinion correlating to PCT/IB2007/053166 dated Apr. 23, 2008.

* cited by examiner

*Primary Examiner* — Danh Le (57) ABSTRACT

A master radiofrequency integrated circuit (RF IC) and a slave radiofrequency integrated circuit include a master radiofrequency module and a slave radiofrequency module, respectively. Both RF ICs include a radiofrequency side contact connectable to an antenna, for receiving radiofrequency signals, via the antenna, from a wireless communications network and a baseband side contact connected to the radiofrequency module and connectable to a contact of a baseband integrated circuit, for transmitting the baseband signals from the master radiofrequency module to the baseband integrated circuit. The RF module is connected to the radiofrequency side contact, for converting the radiofrequency signals into baseband signals. The master radiofrequency module includes a slave control unit for controlling the slave radiofrequency module. The master RF IC has a slave side contact connected to the slave control unit and to the slave RF IC, for transferring a control signal or data from and/or to slave radiofrequency module when the slave radiofrequency module is connected to the contact of the baseband integrated circuit. The slave RF IC includes a master side contact connected to a control interface of the slave RF module and connectable to a master radiofrequency module on another RF IC, for receiving the control signals from the master radiofrequency module.

20 Claims, 3 Drawing Sheets

ARRANGEMENT OF RADIOFREQUENCY INTEGRATED CIRCUIT AND METHOD FOR MANUFACTURING THEREOF

FIELD OF THE INVENTION

This invention relates to a master radiofrequency integrated circuit, a slave radiofrequency integrated circuit, a radiofrequency arrangement, a wireless communication unit, a mobile communications device, a method for manufacturing a radiofrequency arrangement as well as a kit and a method for manufacturing a wireless communication unit as described in the accompanying claims.

BACKGROUND OF THE INVENTION

Wireless communication units, such as wireless communications handsets, typically incorporate a number of distinct and operably coupled sub-systems, in order to provide the wide variety of functions and operations that a complex wireless communication unit needs to perform. Such sub-systems may include radiofrequency functions on radiofrequency integrated circuits (RF IC) such as radiofrequency generation, power amplification, (de)modulation, filtering logic, etc. as well as baseband function on baseband integrated circuits (BBIC) such as audio circuits, encoding/decoding, processing logic, etc. and memory units. Typically, a baseband integrated circuit includes one or more baseband modules that can be operably coupled to one or more RF modules on an RF IC. Interfaces are defined for communicating between the respective modules and ICs. For example, the dual-Mode 2.5G/3G BASEBAND/RF IC Interface Standard, from hereon referred to as "DigRF 3G" defines interfaces between the BBIC and the RF IC for dual-mode 3GPP 3G/2.5G (UMTS/EGPRS) implementations.

It is known to provide a wireless communication unit with two or more antennas and two or more receiving paths, e.g. by providing two or more RF modules each connected to a different antenna, in order to improve the performance of the wireless communication unit, which is generally referred to as a receiver spatial diversity scheme.

For example, DigRF defines a physical interconnection between baseband and RF integrated circuits for digital cellular terminals. DigRF 3G defines that the receiver spatial diversity scheme may use two RF ICs, in which case the BBIC has to have a separate contact for each of the RF ICs. United States Patent Application Publication US20070071078 discloses a radio apparatus complying with the Baseband/RF Digital Interface Specification, EGPRS Version, from hereon referred to as "DigRF 2G". DigRF 2G defines interfaces between the BBIC and the RF IC for 2G/2.5G GSM (E-GPRS) implementations. The radio apparatus disclosed in the aforementioned patent application publication comprises a first radio-frequency unit and a second radio-frequency unit both configured to receive a reception signal transmitted from a communication partner, and configured to transmit a transmission signal to the communication partner. The apparatus further has a baseband processing unit configured to be supplied with the reception signal from each of the first radio-frequency unit and the second radio-frequency unit, and supply, to each of the first radio-frequency unit and the second radio-frequency unit, data to be transmitted to the communication partner, The baseband processing unit is configured to generate a reference signal supplied to each of the first radio-frequency unit and the second radio-frequency unit. A digital signal supplying unit is configured to supply a digital signal containing the reference signal from the baseband processing unit to each of the first radio-frequency unit and the second radio-frequency unit. The baseband processing unit demultiplexes the signal received by each radio-frequency unit, and multiplexes the demultiplexed signals, thereby reconstructing one piece of information.

However, this has the disadvantage that this increases the number of contacts on the BB IC and hence increases costs and size of the BB IC.

The 3G DigRF digital interface standard specifies that, as an alternative, the receiver spatial diversity scheme may be implemented as a single RF IC which has two RF modules connected to a single contact of the RF IC via a multiplexer. However, this increases the costs and the footprint of the RF IC and reduces the flexibility during the manufacturing of the wireless communication unit because it is not possible to select other RF modules than those provided on the RF IC.

SUMMARY OF THE INVENTION

The present invention provides a master radiofrequency integrated circuit, a slave radiofrequency integrated circuit, a radiofrequency arrangement, a wireless communication unit, a mobile communication device, a kit for manufacturing a radiofrequency arrangement, a method for manufacturing a radiofrequency arrangement and a method for manufacturing a wireless communication unit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
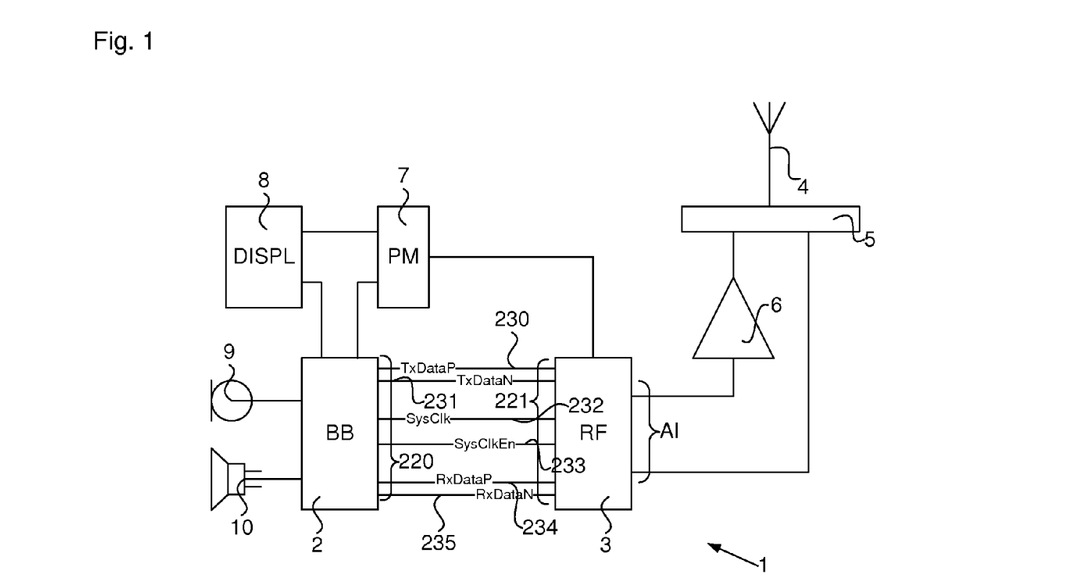
FIG. 1 schematically shows a block diagram of an example of an embodiment of a wireless communication unit.

Referring first to FIG. 1, there is shown a simplified block diagram of part of a wireless communication unit 1. The wireless communication unit 1 may for example be provided in a multimode mobile telephone or other wireless terminal which can be connected via a wireless connection to a (tele-) communications network in order to exchange data, video and/or speech. As shown, the wireless communication unit 1 may include a baseband (BB) IC 2 and a radiofrequency (RF) arrangement 3. The BB IC 2 may perform a number of data processing operations and/or signal processing operations at baseband frequencies. The radiofrequency (RF) arrangement 3 may perform a number of signal processing operations, such as converting baseband signals from or to RF signals, filtering signals and/or (de)modulating signals. A voltage regulator (not shown) associated with the RF arrangement 3 may be part of a power management (PM) module 7, with the BB IC 2 maintaining control of the power management (PM) module 7.

An antenna 4 may be coupled, via a 3G duplex filter and/or antenna switch 5, to an antenna interface (AI) of the RF arrangement 3. RF signals may be received from and/or transmitted to a wireless communication channel at the antenna 4. The antenna switch 5 may provide isolation between receive and transmit chains within the wireless communication unit 1.

The receiver chain may, include numerous receiver circuitries, from hereon commonly referred to as the RF receiving unit, on the RF arrangement 3, such as receiver front-end circuitry providing reception, filtering and intermediate or baseband frequency conversion. The receiver chain may further include circuitry on the BB IC 2, from hereon commonly referred to as the baseband receiving unit for example to process baseband signals received from the RF arrangement in order to output information, such as data, video and/or speech, represented by the baseband signals in a for humans perceptible form, for example on output devices connected to the baseband device 2, such as at a display 8 or a speaker 10. The baseband signals may for example be digital signals which represent the information in the baseband signals (and optionally other information) in a digital form.

The transmit chain of the wireless communication unit 1 may include one or more input devices, such as a microphone 9 and/or a keypad (not shown), coupled to the BB IC 2, via which information, such as data, video and/or speech, may be inputted to the BB IC 2. The transmit chain may include circuitry, from hereon commonly referred to as the baseband transmission unit, in the BB IC 2 which generates baseband signals representing the information. The baseband signals may for example be digital signals which represent the inputted information (and optionally other information) in a digital form. The transmit chain may further include circuitry in the RF arrangement 3, from hereon commonly referred to as the RF transmission unit. The RF transmission unit may be coupled to a radiofrequency power amplifier 6 and thereafter to the antenna 4, in this example via the antenna switch or duplex filter 5 in order to output signals via the antenna 4.

Signals inputted at the input device may be processed by the BB IC 2 and may be transmitted at baseband frequency to the RF arrangement 3. The RF arrangement 3 may then convert the received baseband signals into signals at radiofrequency which are suitable to be transmitted, optionally after being subjected to further operations such as power amplification (by the power amplifier 6), via the antenna 4, over a wireless connection.

As shown in FIG. 1, the RF arrangement 3 may be communicatively connected to the BB IC 2. An interface may connect the BB IC 2 and the RF arrangement 3. The RF arrangement 3 may include an RF-side 221 of the interface, at which signals can be outputted to the baseband IC 2 and/or received from the baseband IC 2. The baseband IC 2 may include a baseband side 220 of the interface, at which signals can be outputted to the RF arrangement 3 and/or received from the RF arrangement 3.

As is explained below in more detail, the interface connecting the BB IC 2 and the Rf arrangement 3 may include a RF-to-baseband interface, from hereon referred to as the RF-BB interface, which connects the RF arrangement 3 to the BB IC 2 and via which signals can be outputted by the RF arrangement 3 to the baseband IC 2. The interface may also include a baseband-to-RF interface, from hereon referred to as the BB-RF interface, via which signals can be outputted by the baseband IC 2 to the RF arrangement.

The RF side of the RF-BB interface may be referred to in the following as the RF RF-BB Int. The RF side of the BB-RF interface may be referred to in the following as the RF BB-RF Int. The baseband side of the RF-BB interface may be referred to in the following as the BB RF-BB Int. The baseband side of the BB-RF interface may be referred to in the following as the BB BB-RF Int.

The RF-BB interface and the BB-RF interface may be implemented in any manner suitable for the specific implementation. As shown in the examples, the RF side 221 of the interface and the baseband side 220 of the interface may for instance both include a number of pins. The RF side 221 of the interface and the baseband side 220 of the interface may for instance have six pins or eight pins, to carry electrical signals there between. The pins may for example be connected to different paths 230-235 such as a separate transmission paths 230-231 and receiving paths 234-235. The paths may for instance include a differential transmission path including TxDataP line 230, TxDataN line 231, a differential receiving path including RxDataP line 234, and RxDataN line 235, a single ended SysClk line 232 and a single ended SysClkEn line 233. The paths may for example be electrically conducting paths connecting the pins, for example on a printed circuit board. However, it will be apparent that the interface may be connected in any manner enabling the transfer of signals from the baseband IC 2 to the RF arrangement 3. However, depending on the communication protocols to comply with, other pins and paths may be provided.

Figure 2:
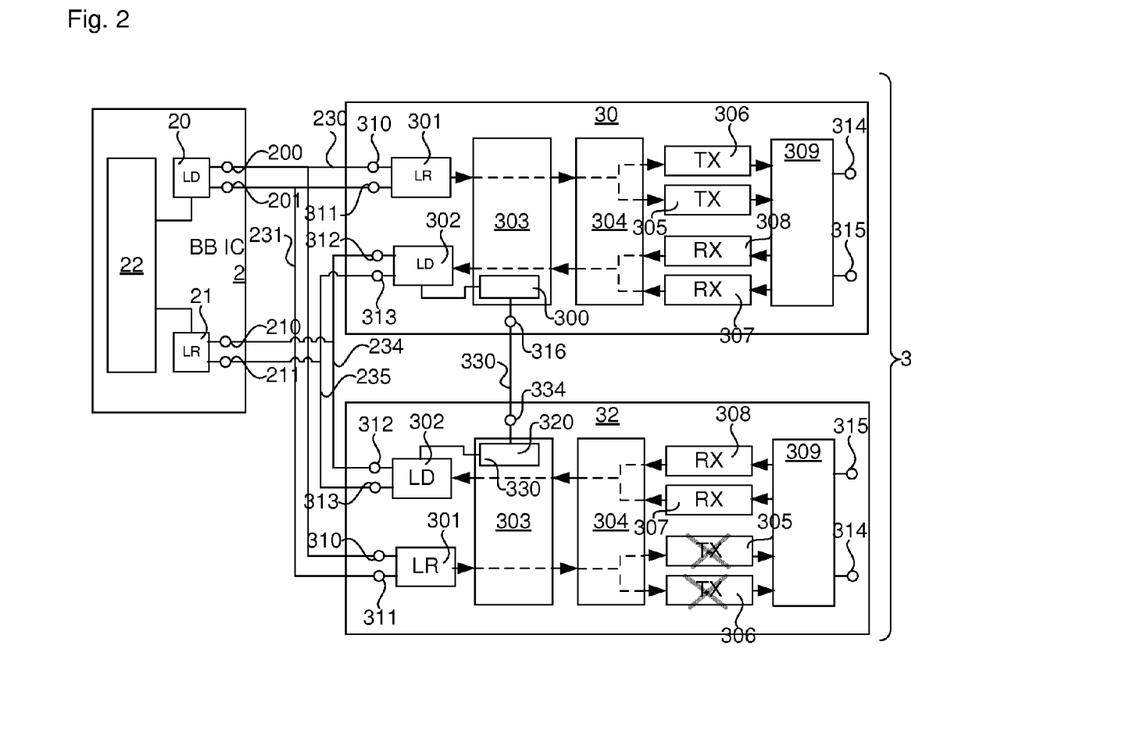
FIG. 2 schematically shows a block diagram of a first example of an embodiment of a radiofrequency arrangement which may be used in the example of FIG. 1.
Figure 3:
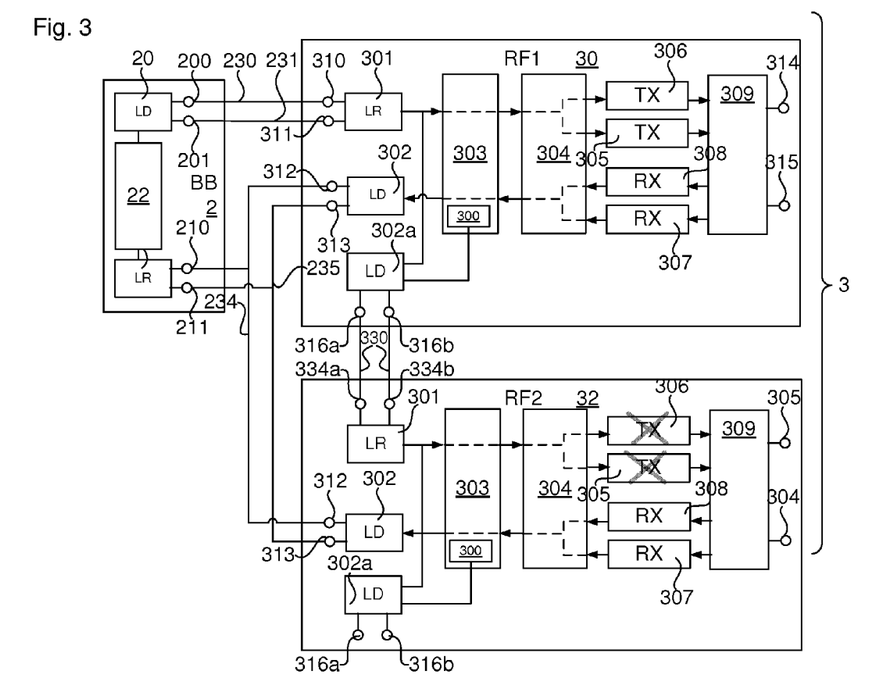
FIG. 3 schematically shows a block diagram of a second example of an embodiment of a radiofrequency arrangement which may be used in the example of FIG. 1.

As illustrated in FIGS. 2 and 3, the BB IC 2 may include a BB module 22 which may perform a number of data processing operations and/or signal processing operations at baseband frequencies. The BB module 22 may, as shown be connected to the baseband side 220 via a line driver 20 and a line receiver 21. The line driver (LD) 20 may be a part of the BB-RF interface and may be connected to a contact 200,201 of the BB side 220, which contact 200,201 can be connected to a respective transmission path 230,231. The line receiver (LR) 21 may be a part of the BB-RF interface. The LR 21 may be connected to a contact 210,211 of the BB side 220 which can be connected to a respective receiving path 234,235. (In FIGS. 2 and 3 SysClk line 232 and SysClkEn line 233 are omitted for sake of simplicity). The signals exchanged between the baseband side 220 and the radio frequency side 221 may for example be digital signals and hence represent binary data. The baseband module 22 may be implemented in any manner suitable for the specific implementation, for example as described in International Patent Application PCT/IB2007/051979.

The LD 20 and the LR 21 may connect respective units (not shown for sake of simplicity) in the BB module 22, such as a baseband receiving unit or a baseband transmission unit to the respective lines 230-235 at the RF side interface of the baseband module 2. The (units in the) BB module 22 can receive and/or output signals via the respective lines 230-235 from/to the baseband side interface of the RF arrangement 3.

As shown in FIGS. 2 and 3, the RF arrangement 3 may include two or more RF ICs 30,32. The RF ICs 30,32 may for example include a master RF IC 30 and a slave RF IC 32. The master RF IC 30 and the slave RF IC 32 may include one or more similar components. The master RF IC 30 and the slave RF IC 32 may for example be the identical or be different but contain similar components. In FIGS. 2 and 3 like components in the RF ICs 30,32 have been indicated with the same reference numbers and, for sake of brevity those components will be described with reference to the configuration of the master RF IC 30 only. For example, the master RF IC 30 and the slave RF IC 32 may for example include identical circuitry, but may have been configured differently before being put into use, e.g. during manufacturing. For example, the RF ICs 30,32 may include an, erasable or non-erasable, non-volatile memory in which a type configuration is stored which identifies whether the respective RF ICs has to exhibit master or slave behaviour.

The master RF IC 30 may include one or more RF contacts 314,315 which can be connected to the antenna 4, in order to receive or transmit RF signals via the antenna 4. The master RF IC 30 may for example include a transmission contact 314 which can be connected to the antenna 4 in order to output signals to the antenna 4. The master RF IC 30 may further include a RF receiving contact 315 which may be connected to the antenna 4. At the receiving contact 315 RF signals may be received from a wireless communications network, via the antenna 4.

The master RF IC 30 may include a master RF module 303-309 connected to the contacts 314,315. The master RF module 303-309 may convert the RF signals into BB signals. As shown, the master RF module may for example include, in a direction of signal processing of the RF signals and that order, a (de)modulating circuit 309, receiver line-ups 307, 308, a buffer 304, an interface module 303 and a line driver 302. The demodulating circuit 309 be connected to the antenna 4 and may demodulate the received RF signals. The circuit 309 may for example convert the carrier frequency of the received RF signals to a baseband frequency by mixing them with a local oscillator signal. The demodulating circuit 309 may be connected to the receiver line-up and output the demodulated signals to the receiver line-ups 307,308. The receiver line-up may extract data from the demodulated signals.

The receiver line-up 307,308 may, for example, filter the demodulated signals in an analog or digital manner and/or perform an analog-to-digital conversion. As shown, the RF module may include two or more different receiver line-ups 307,308, for example to support different communication modes. The RF module may for example include a receiver line-up 307 suitable for a 2 G communication mode including a very low intermediate frequency filter (VLIF), and include a receiver line-up 308 for a 3 G communication mode including a Square Root Raised Cosine (SRRC) filter. The receiver line-up(s) 307,308 may be connected to the buffer 304 and output the data to the buffer 304. The buffer 304 may be connected to the interface module 303. The interface module 303 may convert data buffered in the buffer 304 into, e.g. data packets or other units of information suitable to be transmitted to the baseband IC 2 over the BB-RF interface and/or the RF-BB interface.

As shown, the interface module 303 may be connected to a line driver 302 and output the data to the line driver 302. The line driver 302 may then transmit the data to the BB IC 2 over the respective path 234,235. As shown in FIGS. 2 and 3, the master RF IC 30 may include a RF-BB contact, in this example formed by two pins 312,313, which forms part of the RF side of the interface between the baseband IC 2 and the RF arrangement 3. The RF-BB contact 312,313 may, as shown, be connected to the master RF module, in the example via the line driver 302. The RF-BB contact 312-313 may be connected to a contact of the BB IC 2, e.g. in the example to pins 210,211. The RF-BB contact on the master RF IC 30 may for example be connected to an RF-BB contact on the BB IC 2 to enable a transfer of signals between them. The connection may, for example, be an optical or electrical connection. For example, the RF-BB contacts on the ICs 2, 30 may be connected via a material medium that confines and guides propagating electromagnetic signals or an electrical conducting medium that enables a transfer of electrical signals between the RF-BB contacts. Via the BB side contact 312,131 the data can be transmitted from the master RF module to the BB IC 2. The data may then be processed by the BB module 22 on the BB IC 2.

The master RF module 303-309 may further be able to convert BB signals received from the BB module 2 into RF signals, and hence be an RF transceiver module. The BB module 22 may for example transmit the data as digital signals and, for instance, transmit the data in frames, packets or other units of information. As shown in FIGS. 2 and 3, the master RF module may, in a direction of signal processing and that order, include the interfacing unit 303, the buffer 304, a transmission line-up 305,306 and modulating circuit 309. The interfacing unit 303 may receive, via the line receiver 301 and the contacts 310,311 data from the RF BB-RF Int and, for example, extract data to be transmitted from the received data. The interfacing unit 303 may be connected to the buffer 304 and output the data to be transmitted to the buffer. The buffer 304 may, as shown, be connected to one or more transmission line-ups. Data buffered in the buffer may be outputted to the transmission line-ups 305,306.

The transmission line-ups 305,306 may for example perform, in that order, a digital modulation and/or, a digital-to-analog conversion (DAC) and/or low-pass filtering of the data to be transmitted. The RF IC 30,32 may for example include two or more different transmission line-ups for different communication modes. For example, the RF IC 30,32 may include a transmission line-up suitable for a 2 G communication mode including a 2G modulator and/or, a transmission line-up suitable for a 3 G communication mode including a Square Root of Raised Cosine (SRRC) filter and/or a transmission line-up suitable for a long term evolution mode including an LTE modulator. As shown in FIGS. 2 and 3, in the arrangement 3 each of the RF ICs 30,32 has its respective transmission line-up. However, only the transmission line-up of one of the RF ICs 30,32 may be active. For example, the master RF IC 30 may disable the transmission line-ups of the slave RF IC 32, for example by transmitting a disable signal to the slave RF IC 32. However, for example when a transmission diversity scheme has to be supported, the transmission line-ups 305,306 of two or more of the RF ICs 30,32 may be active, as illustrated in FIG. 3.

The transmission line-up 305,306 may be connected to the modulating unit 309. The transmission line-up may output signals to the modulating unit 309, which are then modulated by the modulating unit 309 in accordance with the communication mode of the RF IC 3. For example, modulating unit 309 may, inter alia convert the frequency of the signals into an RF frequency, using a suitable analogue modulation technique, such as frequency modulation, phase modulation, amplitude modulation or a combination thereof. The modulating unit 309 may be connected to the antenna 4, e.g. via the power amplifier 6 and/or the antenna switch 5 and output the RF signals via the antenna to a wireless connection.

As shown in FIGS. 2 and 3, the master RF module on the master RF IC 30 may include a slave control unit 300 which can control the slave RF module on another RF IC, e.g. on the slave RF IC 32. The slave control unit 300 may, as shown, be connected to a slave side contact 316 of the master RF IC 30, The slave side contact 316 may be connectable to the slave RF module on the slave RF IC 32 and allow a transfer of control signals and/or data from and/or to the slave RF module 32 when the slave RF module 32 is connected to the contact of the BB IC 2.

As shown in FIG. 2, the slave RF IC 32 may include a master side contact 334 which is connected to the control interface module 320. The master side contact 334 may be connectable to the master RF module on another RF IC, e.g. in the example of FIGS. 2 and 3 to the master RF IC 30. As shown, the contacts 316,334 may be connected by a connection 330, such as one or more bond wire(s), one or more path(s) on a printed circuit board or other type of connection suitable to connect the contacts 316,334 such that signals can be exchanged between the contacts 316,334. Control signals and/or data may be transferred from the master RF IC to the slave RF IC or vice versa over the connection 330.

Figure 4:
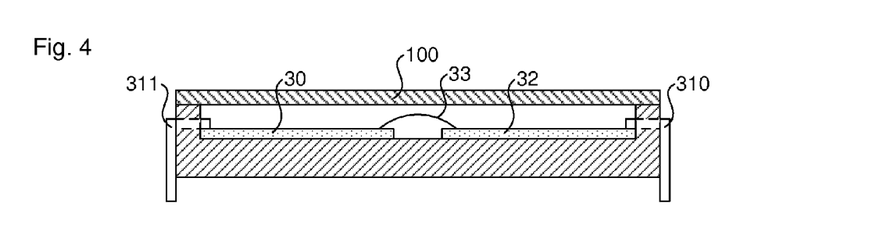
FIGS. 4 and 5 show cross-sectional views of examples of an embodiment of a radiofrequency arrangement.
Figure 5:
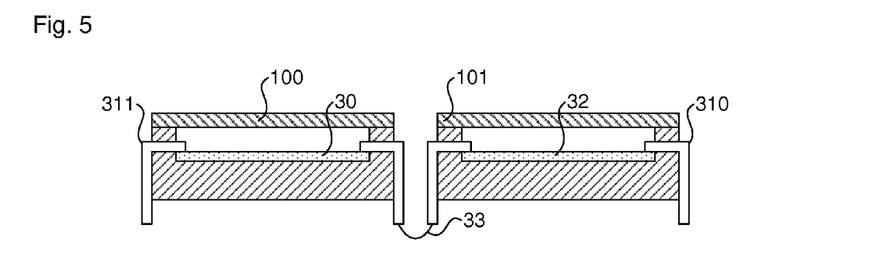

At the master side contact 334, control signals for controlling the slave RF module may be received. As shown, the slave RF module may include a control interface module 320 connected to the master side contact 334. The control interface module 320 may receive and/or transmit control data from and/or to the slave radiofrequency module when the master radiofrequency module is connected to the contact 230,231 of said baseband integrated circuit. Thus, the transmission of data from the master and slave modules may be controlled and hence a spatial receive diversity scheme can be supported while collision between data from the master RF IC 30 and the slave RF IC 32 can be prevented. Furthermore, since the master RF IC 30 and the slave RF IC 32 are different integrated circuits, the arrangement 3 may be flexible because there can be a freedom of choice in the selection of the slave RF module for a given master RF module. As illustrated in FIG. 4, the master RF IC and the slave RF IC may for example be provided in the same package 100. Alternatively, as shown in FIG. 5, the master RF IC and the slave RF IC may be provided in different packages 100, 101. Also, the wireless communication unit 1 may be relatively simple because the slave RF IC 32 and the master RF IC 30 are both connected to the same contacts of the baseband IC 2. Thus, the number of contacts on the baseband IC 2 may be relatively small.

The RF IC 30,32 may include in the data transmitted to the BB IC 2 an identification of the RF IC 30,32 from which the data originates. For example, the master or slave RF module may include in the non-payload part of packets, such as in the header, an master/slave field which indicates that the packet originates from the master RF IC or the slave RF IC, e.g. a binary 1 indicating the master RF IC and a binary 0 indicating the slave. Thus, the BB IC 2 can distinguish between the different RF ICs and hence separate the different data streams.

The slave control unit 300 may be arranged to select an enabled module from the master RF module and the slave RF module. The enabled module may be the module that, at a given time, is allowed to transmit data to the baseband module 22. For example, the master RF module may be selected as the enabled module by default and the slave RF module may be selected after a request from the slave RF module, transmitted via the connection 330 and the contacts 316,334, as is explained below in more detail with reference to FIG. 6. The transmission from the other, non-enabled modules may then be inhibited, as explained below in more detail.

The slave control unit 300 may for example enable only a single RF IC 30,32 at the time to transmit signals to the BB IC 2. As mentioned, for example by default the master RF IC 30 may be allowed to transmit data to the BB IC 2 via the RF-BB interface, and the slave module may request the slave control unit 300 to switch from the default mode, in which the master is selected, to a slave selected mode.

Figure 6:
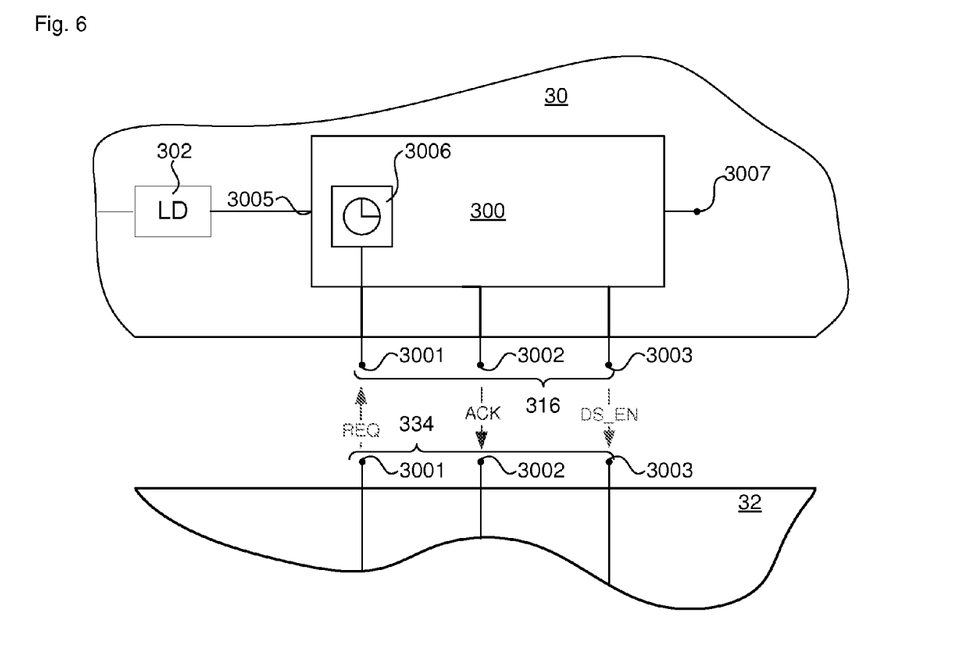
FIG. 6 schematically shows an example of an embodiment of a connection between a master RF IC and a slave RF IC.

Referring to the example shown in FIG. 6, the slave side contact 316 may for instance include one or more pins 3001-3003 or other types of contacts which can be connected to corresponding pins or other types of contacts on the slave RF IC 32, and hence connect the slave control unit 300 to the slave interface module 320 on the slave RF IC 32. The same types of pins or contacts may be present on both RF IC modules 30, 32. The direction of the pins, that is whether or not the respective pin is an input pin or an output pin, may be determined by the master/slave status of the respective RF IC. For example, the pins may be bi-directional by default, and the direction of the pins on the respective RF IC may have been set corresponding to the master or slave states of the RF IC 30,32 after manufacturing of the RF IC, for example during the factory phasing stage. For example, a fuse may be blown or not to determine if a respective one of the pins is an input pin or an output pin.

The pins 3001-3003 may include different types of pins, e.g. a different type for each different type of message, such as a request (REQ) pin 3001, an acknowledge (ACK) pin 3002, and a Deep Sleep Enable (DS_EN) pin 3003 In the example shown in FIG. 6, for instance, on the master RF IC 30, the REQ pin 3001 is an input, the ACK pin 3002 and the DS_EN pin 3003 are outputs. On the slave RF IC 32 on the other hand, the REQ pin 3001 is an output while the ACK pin 3002 and the DS_EN pin 3003 are inputs.

As shown in FIG. 6, the slave control unit 300 may be connected to the REQ pin 3001 in order to receive an enable request (REQ) message from the slave radiofrequency module. By means of the REQ signal, the slave RF module may request the slave control unit 300 to provide access to the baseband connections 234,235. The slave RF module may for example send the REQ message to the slave control unit 300 via the contacts 316,334 and the connection 330 when data has been received by the slave RF module via the antenna 4.

The slave control unit 300 may in response to the REQ message determine whether one or more slave transmission to BB criteria are fulfilled, for example whether the master RF module is transmitting data to the baseband IC. The slave control unit 300 may for example have a transmission detection input 3007 at which signals indicating whether or not the master RF module is transmitting data can be received, as shown in FIG. 6. The transmission detection input 3007 may for example be connected to the interface module 303 in order to data ready for transfer to the BB on the master RF IC 30.

When the slave transmission criteria are fulfilled, e.g. when the master RF module is not transmitting data, the slave control unit 300 may allow the slave RF module to transmit data to the BB IC 2. As illustrated in FIG. 6, for example, the slave control unit 300 may be connected to the ACK pin 3002. The slave control unit 300 may transmit the ACK signal to the slave RF module when the slave transmission criteria are fulfilled, thereby acknowledging the request from the slave radiofrequency module and granting the slave radiofrequency module access to the BB via 234,235.

When the slave enable criteria are not fulfilled, e.g. when the master RF module is transmitting data, the slave control unit 300 may refrain from selecting the slave RF module. For example, the slave control unit 300 may transmit a disable signal to the slave RF module. In the example shown in FIG. 6, the slave control unit 300 may for example, postpone transmitting the ACK message to the slave RF.

When the acknowledge message has not been received within a predetermined period of time, the slave RF module may determine that an error has occurred and, for example remain in a non-transmitting mode, retransmit the request message or perform another predetermined action.

The slave RF module may for example be inhibited from transmitting to the BB IC 2 without getting an ACK from the slave control unit 300. For example, by default the RF-BB contacts 312-313 on the slave RF IC 32 may be in a high impedance mode and may be set to a low impedance mode in response to the acknowledge message ACK, in response to the outputting of the ACK signal or other type of selection of the slave RF IC 32 as the enabled RF IC. The transmission from the master RF module to the baseband IC may then be blocked, for example by setting the contacts 312,313 on the master RF IC 30 to a high impedance mode, for example by outputting an impedance control signal via a suitable control output 3005 of the slave control unit 300 to the line driver 302.

As shown in FIGS. 2 and 3, the RF-BB contact 312,313 on the slave RF IC 32 and the master RF IC 30 may for example be directly connectable to the contact 210,211 of the baseband integrated circuit 2. Accordingly, by setting the contacts on the respective RF ICs 30,32 to a high impedance mode, the transfer may be blocked in a simple and effective manner.

In the shown examples, the RF-BB contacts 312,313 are connected to a respective output of a line driver 302. Accordingly by setting the output of the line driver 302 to high impedance, the contacts on the respective RF ICs 30,32 may be set to a high impedance mode as well.

In the example shown in FIG. 6, once the slave RF IC 32 has finished with transmitting the data to the BB IC 2, the slave RF module may output the REQ message again, in order to indicate to (the slave control unit 300 in the) master RF module that the slave RF module has finished the transmission of data, and that the master RF module may be selected again. The slave RF module may further set, in response to finishing the transmission data set the contacts 312,313 to a high impedance mode, thus avoiding a collision between the master RF IC 30 and the slave RF IC 32.

It will be apparent that the selection of the slave RF module as the enabled module may be terminated in another manner. For instance, as shown in FIG. 6, the slave control unit 300 may include a timer 3006 for timing a period of time the slave RF IC 32 is selected. The slave control unit 300 may compare the timed period with a threshold period and output a disable signal when the timed period exceeds a threshold period. For example, the timer 3006 may be started when the enable signal is outputted by the slave control unit 300 and stopped when the disable signal is outputted by the slave control unit 300.

As shown in FIG. 6, the slave control unit 300 may be connected to the DS_EN pin 3003 in order to transmit a Deep Sleep Enable (DS_EN) message to the to the slave radiofrequency module. The function of the DS_EN (Deep Sleep Enable) is to enable/disable the slave radiofrequency module. This can be used when RX diversity is not supported or needed and therefore only one RF IC (the master) is required. Thereby, the power consumed by the slave RF module may be saved.

As shown in FIGS. 2 and 3, the slave radiofrequency IC and the master RF IC may have RF BB-RF contacts 310-311 at which signals may be received from the baseband IC 2. The RF BB-RF contacts 310-311 of both RF ICs 30,32 may be connected, directly or indirectly, to the same contacts of the baseband IC 2. The baseband module 22 may include in the data transmitted to the RF ICs an identification of the RF ICs for which data is intended. For example, the baseband module 22 may include in the non-payload part of packets, such as in the header, an master/slave field which indicates that the packet is intended for the master RF IC or the slave RF IC, e.g. a binary 1 indicating the master RF IC and a binary 0 indicating the slave or vice versa.

As shown in FIG. 2, the RF BB-RF contacts 310-311 of the slave RF IC 32 and the RF BB-RF contacts 310, 311 of the master RF IC 30 may be directly connected to the baseband contact 200,201 of the BB IC 2 and the BB IC 2 can transmit the data to both the RF ICs 30,32.

Alternatively, the slave RF IC 32 may be indirectly connected to the baseband contacts 200,201 of the baseband IC. For example the slave RF IC 32 may be connected to the BB IC 2 via the master RF IC 30. Thereby, the BB only sees the connection to the master RF IC when transmitting data from the BB to the RF ICs.

As shown in FIG. 3, for example, the slave RF IC 32 may have master side contacts 334a,334b which are connected to slave side contacts 316a,316b of the master RF IC. The master side contacts 334a,334b may be connected to the slave RF module via a line receiver 301 on the slave RF IC 32, as shown in FIG. 3 The slave side contacts 316a,316b of the slave RF IC 32 can communicate to the baseband contacts 200,201 of the baseband IC 2 via RF BB-RF contacts 310-311. In the example of FIG. 6, for example the master RF IC 30 includes an additional line driver 302a, which connects the slave side contacts 316a,316b to the LR 301 on the RF IC 30, and hence to the contacts 310,311.

The slave control unit 300 may control the transmission of data to the slave RF IC 32, as shown in the example of FIG. 3, for example, the slave control unit 300 may be connected to a control input of the additional line driver 302a and control the operation of the additional line driver 302a. For example, BB IC 2 may send data to the master RF IC 30. The master RF module on the master RF IC 30 may receive the data, e.g. via line receiver 301. The master RF module may determine for which RF IC 30,32 the data is meant, for example via a tagging in the header or other non-payload part of data packets. If the data is meant for the slave RF module, the slave control unit 300 may enable the line driver 302a, thereby the data received by the additional line driver 302a from the line receiver 301 (and indented for the slave RF module to the slave RF IC 32) may be forwarded, e.g. via the master additional line driver 302a and the slave line receiver 301. Thereby, a transmit diversity scheme may be supported and the BB IC 2 can use both the master RF IC 30 and the slave RF IC 32 to transmit data to the antenna 4. Additional a receive diversity scheme may be supported and the BB IC 2 can use both the master RF IC 30 and the slave RF IC 32 to receive data from the antenna 4.

In addition to forwarding the data from the BB IC 2, the slave control unit 300 may output control signals to the slave RF module via additional line driver 302 and the contacts 316a and 316b.

In the example of FIG. 3 two RF ICs 30,32 are shown. However, it will be apparent that more than two RF ICs may be present. For example, as shown in FIG. 3, the slave RF IC 32 may include an additional line driver 302a and additional contacts 316a,316b. Thereby, further RF ICs can be connected to the slave RF IC 32, which may then act as a master for the further RF ICs Also, further RF ICs may be connected to the contacts 316a,316b of the master RF IC 30.

Figure 7:
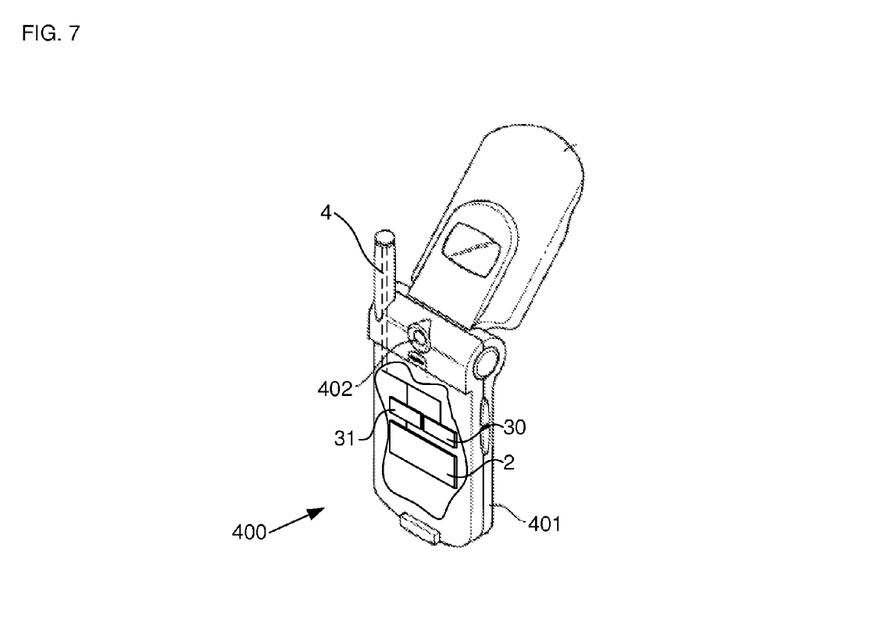
FIG. 7 shows a partially opened perspective view of an example of an embodiment of a mobile communication device in which the example of FIG. 1 may be used.

FIG. 7 schematically shows a mobile communication device 400, in this example a mobile telephone. The mobile communication device 400, may include a wireless communication unit 1 which is connected to the antenna 4 of the mobile communication device 400. As shown, the wireless communication unit 1 is provided in a cover 401 and may be connected to input and/or output device of a user interface, such as a camera 402 to input or output data to be send over or receive from a wireless channel.

In the foregoing specification, specific examples of embodiments have been described. It will, however, be evident that various modifications and changes may be made therein without departing from the broader spirit and scope of the invention as set forth in the appended claims.

For example, the connections may be a type of connection suitable to transfer signals from or to the respective nodes, units or devices, for example via intermediate devices. Accordingly, unless implied or stated otherwise the connections may for example be direct connections or indirect connections.

Also, for example, depending on the settings of the RF arrangement 3 and the baseband module 2, the wireless communication arrangement 1 may have different communication modes in which the arrangement 1 operates in a manner compatible or complying with a different communication protocol. The communication protocol may for example be a telecommunication protocol, such as for instance a second generation (2G) mobile communication protocol such as CDMA or GSM, a 2.5G mobile communication protocol such as EGPRS, a $3^{rd}$ generation mobile communication protocol such as UMTS, or WCDMA, or a $4^{th}$ generation mobile communication protocol, such as Long Term Evolution (LTE), WiMax or WiBro. The communication protocol may for example be a data communication protocol such as for a wireless local area network or a metropolitan area network, for instance a protocol in the IEEE 802 series, such the WiMax (Worldwide Interoperability for Microwave Access) or WiBro (Wireless Broadband) protocols. For instance, the communication modes may include modes in which the specific communication protocol complied with may include one or more of the group consisting of CDMA, EGPRS and WCDMA, WiMax, WiBro, LTE, WiFi, 802.11 series, (Wideband) Universal Serial Bus and future 4G standards.

Furthermore, it will be apparent that the contacts may be provided at any physically position of the integrated circuits, and although for example referred to as baseband side or slave side, this does not imply that the respective contact is provided at the edge of the integrated circuit die that faces the BB IC or the slave RF IC.

Also, the invention is not limited to physical devices or units implemented in non-programmable hardware but can also be applied in programmable devices able to perform the desired device functions by configuring the programmable devices in accordance with suitable program code, such as field programmable gate arrays, complex programmable logic devices (CPLD) or other programmable logic devices. Furthermore, the invention may be implemented as a kit for manufacturing a wireless communication unit and/or a baseband IC and/or RF ICs. For example, the invention may be implemented as a kit of parts including a baseband IC, a master RF IC and a slave RF IC which can be connected to each other to form a wireless communication unit. Also, for example as a data carrier on which a set of data representing a semiconductor device lay-out is stored, a mask set including one or more masks, program code for programming a programmable logic device or other kit suitable for manufacturing a slave RF IC or a master RF IC.

Furthermore, the devices may be physically distributed over a number of apparatuses, while functionally operating as a single device. Also, devices functionally forming separate devices may be integrated in a single physical device. For example, the power management module 7 may be integrated in the baseband IC 2.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage. Furthermore, the term 'contact' includes any physical interface on an integrated circuit to the outside world, such as to another integrated circuits, via which signals may be outputted. The contact may for example be of a type can be physically connected, for example by welding or soldering, to patterned conducting layers on a printed circuit board, to bond wires or other suitable electrically conducting paths, such as for example bond pads on a die or pins of a packaged integrated circuit.

The invention claimed is:

1. A master radiofrequency integrated circuit, comprising:
a radiofrequency side contact connectable to an antenna, for receiving radiofrequency signals, via said antenna, from a wireless communications network;
a master radiofrequency module connected to said radiofrequency side contact, for converting said radiofrequency signals into baseband signals; and
a RF to baseband interface side contact connected to the master radiofrequency module and connectable to a RF to baseband interface side contact of a baseband integrated circuit, for transmitting said baseband signals from the master radiofrequency module to said baseband integrated circuit;
wherein said master radiofrequency module includes:
a slave control unit for selecting an enabled module which is allowed to transmit data to the baseband integrated circuit from the master radiofrequency module and a slave radiofrequency module on another radiofrequency integrated circuit; and
a slave side contact connected to said slave control unit and connectable to said slave radiofrequency module, for transferring information indicating when a baseband side contact of said slave radiofrequency module is connected to said contact of said baseband integrated circuit, enabling a transmission of baseband signals to said baseband integrated circuit by said slave radiofrequency module when said slave radiofrequency module is said enable module and inhibiting said transmission when said slave radiofrequency module is a non-enabled module.

2. A radiofrequency arrangement comprising:
a master radiofrequency integrated circuit as claimed in claim 1;
a slave radiofrequency integrated circuit; including:
a radiofrequency side contact connectable to an antenna, for receiving said radiofrequency signals via said antenna from a wireless communications network;
a slave radiofrequency module connected to said radiofrequency side contact, for converting radiofrequency signals to baseband signals, said slave radiofrequency module including a control interface for receiving and/or transmitting control data from and/or to a master radiofrequency module;

a RF to baseband interface side contact connected to the slave radiofrequency module and connectable to a RF to baseband interface side contact of a baseband integrated circuit, for transmitting said baseband signals from the slave radiofrequency module to said baseband integrated circuit;

wherein said radiofrequency integrated circuit includes a master side contact connected to said control interface and connectable to a master radiofrequency integrated circuit, for receiving control signals enabling transmission of baseband signals to said baseband integrated circuit by said slave radiofrequency module when a baseband side contact of said master radiofrequency module is connected to said baseband integrated circuit; and a connection between the slave side contact and the master side contact, for transferring control signals and/or data from the master radiofrequency integrated circuit to the slave radiofrequency integrated circuit or vice versa.

3. A radiofrequency arrangement as claimed in claim 2, wherein said master radiofrequency integrated circuit and said slave radiofrequency integrated circuit are provided in the same package.

4. A radiofrequency arrangement as claimed in claim 2, wherein said master radiofrequency integrated circuit and said slave radiofrequency integrated circuit are provided in different packages.

5. A radiofrequency arrangement as claimed in claim 2, wherein said slave side contact and said master side contact each includes at least one bidirectional contact of which the direction is dependent on whether the respective radiofrequency integrated circuit is configured to be a master or a slave.

6. A radiofrequency arrangement as claimed in claim 2, wherein said RF to baseband interface side contact of said slave radiofrequency module is connected to said RF to baseband interface side contact of the baseband integrated circuit via the master RF radiofrequency module.

7. A radiofrequency arrangement as claimed in claim 2, wherein said RF to baseband interface side contact of said slave radiofrequency module is directly connectable to the contact of the baseband integrated circuit.

8. A radiofrequency arrangement as claimed in claim 2, including at least two slave radiofrequency integrated circuit connected with their master side contact to the same master radiofrequency integrated circuit.

9. A radiofrequency arrangement as claimed in claim 2, wherein the master and slave radiofrequency integrated circuits are arranged to output said baseband signals and status data at the radiofrequency to baseband interface side contact and include a baseband to radiofrequency interface side contact for receiving baseband signals to be converted in radiofrequency signals and/or receiving control data from a baseband module.

10. A wireless communication unit, including:
a radiofrequency module as claimed in claim 2 and
a baseband integrated circuit including a baseband module connected to a contact of the baseband integrated circuit; and
a radiofrequency to baseband interference including said contact of said baseband integrated circuit, the RF to baseband interface side contact of the master radiofrequency integrated circuit and the RF to baseband interface side contact of the slave radiofrequency integrated circuit.

11. A mobile communication device, including a wireless communication unit as claimed in claim 2.

12. A radiofrequency arrangement as claimed in claim 2, wherein said slave control unit is arranged to select a selected module from the master RF module and the slave radiofrequency module, and said slave control unit includes:
a selector input connectable to said slave radiofrequency module, for receiving an enable request signal (REQ) from the slave radiofrequency module;
a first selector output connectable to said slave radiofrequency module, for transmitting an acknowledgement signal (ACK) to said slave radiofrequency module in response to which signal at said baseband side contact of said slave radiofrequency module is enabled or disabled by the slave radiofrequency module; and
a second selector output connected to said RF to baseband interface contact, for enabling or disabling said RD to baseband interface side contact of said master radiofrequency module.

13. A radiofrequency arrangement as claimed in claim 12, wherein said slave control unit includes a third selector output connectable to said slave radiofrequency module, for enabling and disabling the slave radiofrequency module.

14. A radiofrequency arrangement as claimed in claim 12, wherein said slave control unit includes a timer for timing a period of time said RF to baseband interface side contact is enabled and outputting a disable signal (DS_EN) when said time period exceeds a threshold period.

15. A radiofrequency arrangement as claimed in claim 12, wherein said slave side contact and said master side contact each includes at least one bidirection contact of which the direction is dependent on whether the respective radiofrequency integrated circuit is configured to be a master or a slave.

16. A radiofrequency arrangement as claimed in claim 12, wherein said RF to baseband interface side contact of said slave radiofrequency module is connected to said RF to baseband interface side contact of the baseband integrated circuit via the master RF radiofrequency module.

17. A radiofrequency arrangement as claimed in claim 12, wherein said RF to baseband interface side contact of said slave radiofrequency module is directly connectable to the contact of the baseband integrated circuit.

18. A radiofrequency arrangement as claimed in claim 12, including at least two slave radiofrequency integrated circuits connected with their master side contact to the same master radiofrequency integrated circuit.

19. A radiofrequency arrangement as claimed in claim 12, wherein the master and slave radiofrequency integrated circuits are arranged to output said baseband signals and status data at the radiofrequency to baseband interface side contact and include a baseband to radiofrequency interface side contact for receiving baseband signals to be converted in radiofrequency signals and/or receiving control data from a baseband module.

20. A slave radiofrequency integrated circuit, comprising:
a radiofrequency side contact connectable to an antenna, for receiving said radiofrequency signals via said antenna from a wireless communications network;
a slave radiofrequency module connected to said radiofrequency side contact, for converting radiofrequency signals to baseband signals, said slave radiofrequency module including a control interface for receiving and/or transmitting control data from and/or to a master radiofrequency module;
a RF to baseband interface side contact connected to the slave radiofrequency module and connectable to a RF to baseband interface side contact of a baseband integrated circuit, for transmitting said baseband signals from the slave radiofrequency module to said baseband integrated circuit;

wherein said radiofrequency integrated circuit includes a master side contact connected to said control interface and connectable to a master radiofrequency module on another radiofrequency integrated circuit, for receiving control signals enabling transmission of baseband signals to said baseband integrated circuit by said slave radiofrequency module when a baseband side contact of said master radiofrequency module is connected to said contact of said baseband integrated circuit.

* * * * *